United States Patent Office 3,444,400
Patented May 13, 1969

3,444,400
THERMIONIC CONVERTER
Karl Janner and Dietrich Budnick, Erlangen, Germany, assignors to Siemens Aktiengesellschaft, Erlangen, Germany, a corporation of Germany
Filed Oct. 22, 1965, Ser. No. 500,870
Claims priority, application Germany, Nov. 25, 1964, S 94,320
Int. Cl. H02k 7/00
U.S. Cl. 310—4      19 Claims Our invention relates to a converter fuel element, and more particularly to a converter fuel element for nuclear reactors.

Present-day conventional production of electrical energy from nuclear reactors is still limited by the disadvantage that an indirect procedure through a vaporization process is required. It has consequently been suggested heretofore to carry out direct conversion of the heat energy to electrical energy with the aid of so-called thermionic converters. Since the voltage produced between emitter and collector electrodes of such converters is very small, a great number of them have been connected in series both electrically and in structural configuration, i.e. one behind the other. Two different methods are afforded for direct energy conversion of heat produced in nuclear reactors. One of these methods is to transport heat produced in the nuclear reactor to emitter surfaces of the thermionic diodes located outside the reactor by means of a suitable coolant. The other method is to transfer the heat of the nuclear fuel directly along a heat-conductive path to the emitter of the thermionic diodes without requiring any heat carrier or coolant.

For this purpose, it has been further suggested to fill the cylindrical hollow space inside the annular emitter electrodes with fissionable material and to construct the entire series connection of a thermionic diode, as it were, into a converter fuel element and insert it directly into the reactor core.

It is known that for the very high operating temperatures of between 1000 and 2000° C. of such converter elements, an expansion of the emitter electrode, a non-uniform precipitation of vaporized emitter material on the collector electrode, as well as a warping or distortion of the diode cell, cannot be completely prevented. On the other hand, there arises, however, also the demand for keeping the gap or space between the emitter and collector as small as possible so that the efficiency of such converter cells or diodes is as high as possible. In considering the just-mentioned phenomena, this demand for minimal spacing between the electrodes can be met only poorly. However, where the gap is of minimum width, the durability of such a converter fuel element is very limited because premature short-circuiting phenomena then occur between emitter and collector.

It is accordingly an object of our invention to provide improved converter fuel elements which will increase the efficiency of the thermionic converter, thereby effecting an increase in the power density thereof.

It is also an object of our invention to provide a converter burner element of increased life-span and durability.

It is another object of our invention to provide a converter burner element by means of which the electrical power output is controllable.

It is a further object of our invention to provide a converter fuel element which is not only of greater durability itself but which will lead to greater durability of the entire nuclear reactor into which the converter fuel element is inserted.

It is an additional object of our invention to provide a converter fuel element which has a relatively foolproof actuating mechanism even under universal operating conditions, because there are no sliding components located in direct contact with any stationary components.

With the foregoing and other objects in view, in accordance with our invention, we provide converter fuel element for nuclear reactors comprising a plurality of thermionic diodes in series connection and having emitter and collector electrodes with substantially conical surfaces, the emitter electrodes containing a supply of nuclear fuel and being completely insulated from one another. The emitter electrodes are displaceable as a unit in the axial direction thereof for adjusting and correcting the spacing between the respective emitter and collector electrodes. The nuclear fuel is not located in the space between the electrode ring sections as in the prior art fuel elements, but rather is embedded within the electrode material. In accordance with another feature of our invention, a column of high temperature-resistant bodies centered at one end of the emitter and consisting of ceramic, for example, has these bodies connected with one another or pressed against one another in the hollow space defined by the emitter electrodes. In accordance with yet another feature of our invention, centering of the emitter electrodes at their other ends is effected by electrically conducting bridges or connecting members between adjacent collector electrodes which simultaneously provide the series connection of the adjacent thermionic diodes. By means of this central column, the emitter electrodes can be slid sidewise in the axial direction whereby, due to the conical shape of the emitter surfaces, the clearance or spacing thereof with respect to the corresponding collector surface is increased or decreased. In accordance with a further feature of our invention and depending upon the accessibility of this reactor converter fuel element, this axial displacement can be carried out, for example, with the aid of a spindle or with the aid of an electric motor. In accordance with an additional feature of our invention, this control or regulation of the gap between electrodes can consequently take place in accordance with or in dependence on the electrical characteristics, such as current, voltage, internal resistance, capacitance, for example, or through direct or indirect measurement.

Such devices may afford the necessary reliability for land-based or fixed structures or plants. When employing converter fuel elements for furnishing current for air or space craft, this reliability is not afforded however, due to the pressure and temperature conditions prevailing there, as well as the absolute inaccessibility of this structure or installation, so that a solution is demanded which avoids the use of components which slide against one another.

Other features which are considered as characteristic for the invention are set forth in the appended claims.

Although the invention is illustrated and described herein as converter fuel element, it is nevertheless not intended to be limited to the details shown, since various changes may be made therein without departing from the spirit of the invention and within the scope and range of equivalents of the claims.

The converter fuel element of this invention, together with additional objects and advantages thereof, will be best understood from the following description of a specific embodiment thereof when read in connection with the accompanying drawings in which.

Figure 1:
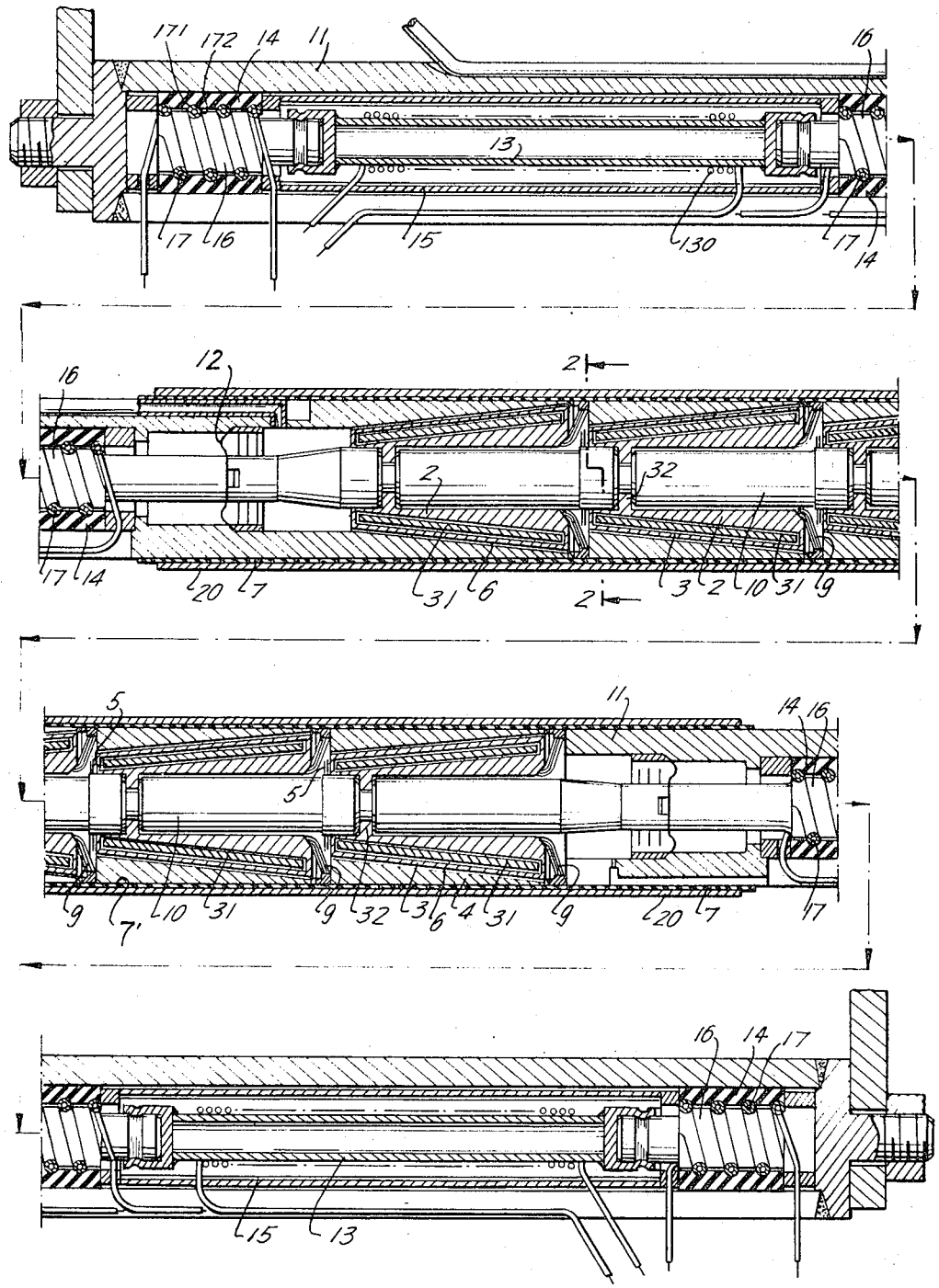
FIG. 1 is a longitudinal section of a converter fuel element constructed in accordance with our invention, which is particularly suitable for insertion in current-producing nuclear reactors for space vehicles.
Figure 3:
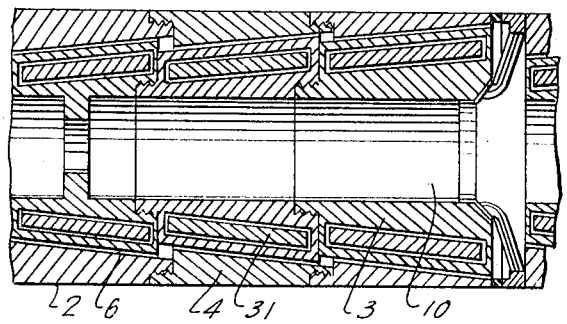
Figure 4:
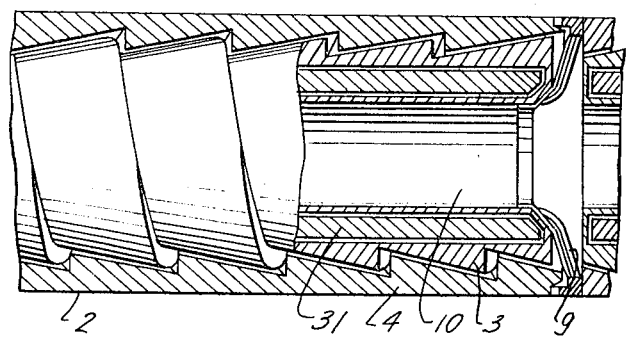

FIG. 3 is a fragmentary enlarged longitudinal section of a modified form of the conical emitter and collector electrodes structure of FIG. 1, providing a shorter axial displacement path for the same change in the clearance between the electrodes; and FIG. 4 shows a fragmentary enlarged longitudinal section of a modified form of the threaded structure of the converter electrodes also providing a shorter displacement path for the same change of clearance between the electrodes.

It is noted at this point that these devices are adapted for use with all systems of thermionic diodes including those with and without cesium vapor atmospheres. In the illustrated and described embodiments, structural components which are related thereto and known per se are omitted.

Referring now to the drawings, thermionic diodes 2 are shown provided with emitter electrodes 3 and collector electrodes 4. Fissionable material 31 is embedded in the emitter electrodes 3 and is fully enclosed therein. A gap or clearance 6, which is to be varied in accordance with our invention, is located between the collector 4 and emitter 3. A column of ceramic structural elements 10 with which the emitter electrodes are connected at one end by an inner projection 32 is located in the interior of the thermionic diodes. This ceramic core does not abut the other regions of the emitter electrodes 3 so that no possible deformation can exert any mechanical pressure on the emitter electrodes. The other ends, respectively, of the emitter electrodes 3 are centered by means of the electrically conductive laminated bridges 9 and are connected thereby with the collector electrodes 4 of the respective adjacent diodes to form an electrical series connection between the diodes. These laminated bridges 9 are resilient structural components, and in the embodiment illustrated in FIG. 1 have a somewhat flat, conical saucer-like shape. The collector electrodes 4 are inserted in the jacket tube 20 and separated therefrom by an intermediate layer of insulation material 7. A solder coating 7' is preferably provided in addition thereto on the insulating layer 7 and is maintained at melting temperature during the period in which the collector electrode is inserted, in order to avoid stresses in the insulating layer 7.

To prevent an undesirable passage of current between the hot regions of adjacent emitter electrodes, shields 5 are provided. These consist, for example, of a thin metallic frame or bracket on both sides of which ceramic material has been sprayed. They can be fitted into the narrow space between the emitters and, furthermore, protect the insulating lengths of the ceramic bodies 10 from being coated with vaporized metallic materials. They furthermore serve simultaneously as a screen against heat radiation. The collector electrode and the emitter electrode located at respective opposite ends of the converter fuel element are connected with a respective current supply tube 11. Each of the current supply tubes 11 carries a screw bolt at its end for mounting the current connectors or junctions, and contains in the hollow interior thereof the mechanism for displacing the emitter electrodes so as to adjust and set the clearance 6 between the electrodes in the manner hereinafter described.

These adjusting and holding devices which are located at both ends of the fuel element are of similar construction and respectively comprise a pair of coaxial and coextensive ceramic bodies 14 and 16 extending within one another with a small clearance therebetween. These adjusting devices are axially spaced from one another by means of a sleeve 15. An expansion rod 13 is located within this sleeve 15 and is firmly connected to the inner ceramic body 16. This expansion rod 13 is furthermore provided with an electric heater winding 130 by means of which the rod can be suitably heated and can thereby be accurately adjusted in length. The ceramic component pairs 14, 16, at the surfaces thereof facing one another, are provided with a tapped thread 171 in which a heater conductor 17 surrounded by a layer 172 of solder is embedded. The sealing of the column of converter diodes from these adjustment devices is afforded by a thick membrane 12.

The operation of the aforedescribed device constructed in accordance with our invention is as follows:

(a) The spacing or clearance between the electrodes has to be reduced, that is, the emitters must be moved a little toward the left-hand side of FIG. 1. For this purpose, both solder connections 172 of the adjusting device on the left-hand side of the fuel element, as viewed in FIG. 1, are heated electrically until the solder is melted. Thereafter, the heating coil for the adjusting device 130 on the right-hand side of the fuel element of FIG. 1 is switched on long enough for the expansion rod 13 on the right-hand side, i.e. in the portion at the bottom of FIG. 1 to achieve the desired elongation, and therewith also the spacing 6 between the electrodes to achieve the desired reduction in width. The expansion rod 13 can consist of beryllium, steel or other non-metallic materials, for example. The heater windings 17 are then switched off together so that the solder 172 hardens and the positions of the emitter electrodes are therefore fixed on both ends of the fuel element. Consequently, the external heating of the adjusting device 17 at the right-hand side of the fuel element as viewed in FIG. 1 is initiated so that the solder connection is loosened there, and thereafter the heating of the expansion rod 13 at the right-hand side of the fuel element of FIG. 1 is turned off. After this the right-hand rod 13 shrinks until its temperature reaches normal ambient temperature; the heating of the external solder location at the right-hand side of the fuel element is turned off so that it cools and cannot absorb any temperature stresses from the ends of the expansion rod 13. The composition of the solder is accordingly selected so that the solder has a melting point of substantially 100 to 200° C. above the normal operating temperature at the solder location. Due to the small quantity of solder which is to be heated and the relatively good heat insulation afforded by the ceramic components 14, 16, the heat capacity is accordingly small and only relatively little electrical power is therefore necessary for this purpose.

(b) The emitter electrodes are displaced toward the right-hand side of FIG. 1 and a consequent increase in the clearance or spacing between the emitter and collector is effected. For the embodiment shown in FIG 1, both solder locations on the right-hand side of the converter fuel element, as viewed in FIG. 1, are initially loosened by the heater coil 17, and simultaneously also the inner solder locations on the left-hand adjusting device. Thereafter, the expansion rod 15 on the left-hand side, i.e. at the top of FIG. 1, is heated so that it is elongated thereby and displaces the emitter electrodes toward the right-hand side of FIG. 1. The heat provided by the heater coils 17 is subsequently turned off so that the ceramic column is held fast in this position. After the soldering of the adjusting mechanism at the left-hand side of the fuel element, as viewed at the top of FIG. 1, is loosened, the heating of the expansion rod 15 is also turned off, so that after the rod 15 has cooled, the heat to the solder at the left-hand side of the fuel element can also be turned off again and the solder at that location cooled. This adjusting mechanism consequently employs a kind of stepwise elevating or raising principle effected by heat expansion of particular structural elements, whereby the necessary holding forces are produced by suitably located solder masses which can be loosened by heating. Instead of heat expansion, naturally, other forces can also be used, such as, for example, the mechanical variations in certain crystals or ceramic materials which are produced by the reciprocal piezoelectric effect.

The adjusting device at one end of the converter fuel element can also be replaced by a spring acting as a restoring force when the displacement is to be made toward the other end of the element.

For a better understanding of the entire aforedescribed apparatus, the following data are given. The spacing 6 between the emitter and collector electrodes has a width in the order of magnitude of 0.1 to 1 mm. The maximum size of the expansion or elongation is substantially 0.1 mm. in the axial direction and produces a variation in the width of the spacing 6 of substantially 0.01 mm. The entide lift or stroke is limited by the centering and resilient laminated bridge members 9 and, in the embodiment of this invention, is substantially in the order of magnitude of 1 mm., which corresponds to a variation in the width of the spacing of 0.1 mm. The maximum distance of lift of the adjusting device is determined by the width of the tapped thread or solder groove 171 and can, by suitably shaping the groove 171, be brought without difficulty to the desired size or dimension.

The relationship of lift displacement to variation of the spacing width is determined by the conicity of the emitter and collector surfaces. The flatter the conical shape is, the smaller will be the spacing variation; the sharper the cone is, the greater will be the change for the same amount of lift. An increase in the slope of the conical shape is possible if the surfaces of the emitter and collector facing one another are formed stepwise, corresponding to the modification shown in FIG. 3. Each diode can then be assembled, as shown, of a number of serially arranged ring-shaped emitters and collectors.

It is also possible, however, to achieve the same effect by permitting the emitter and collector structural components to mesh thread-like one within the other, in accordance with the modification of FIG. 4. In both the modifications of FIGS. 3 and 4, a suitable looseness is, of course, necessary between the meshing steps in order to permit the axial displacement in accordance with our invention to be effected.

The aforedescribed device consisting of two adjusting mechanisms, instead of a single adjusting mechanism, and a restoring or resetting spring, permits an arbitrarily variable pressure to be applied to the ceramic rod column while simultaneously heating the expansion rod whereby any possible undesirable growth phenomena at these ceramic rods 10 can be avoided. Due to the plastic characteristics of the rods 10 at the incident high temperatures, such applied pressure is slowly reduced during the operation. As mentioned hereinbefore, the electrical current produced in the converters can be employed as pilot signal for regulating the performance of the operation and can then also simultaneously be used for heating the adjusting mechanisms. Thus, no extraneous energy sources are required. The adjusting mechanism, current supply tube and coolant supply conduits are of such construction with regard to shape and selection of material, such as beryllium, for example, that they form a portion of the reflector for the nuclear reactor. Only one measurement and regulating component is necessary, since from this one, every element can be selected and tested in any order and the current surges of suitable duration and strength can be withdrawn.

Figure 2:
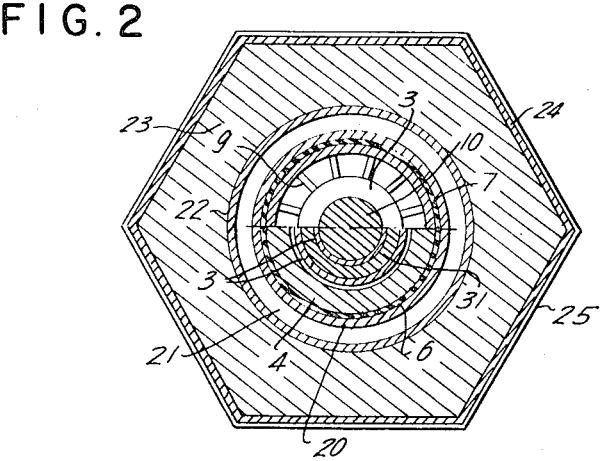
FIG. 2 is an enlarged cross-sectional view of FIG. 1 taken along the line 2—2 in the direction of the arrows and shown enclosed in an outer casing.

As is the case for other converter fuel elements, suitable cooling is afforded the collector electrodes of the fuel element of our invention; however, the means for providing this cooling is not shown in FIG. 1 in the interest of clarity. According to FIG. 2, a cross-sectional view of the collector fuel element of FIG. 1 enclosed in an outer casing, a coolant 21 flows along the surface of the outer shell of the collector fuel element 20 in a gap which is bordered by a coaxial and coextensive outer tube 22. A moderator 23, for example, can be located externally to the tube 22 and can be enclosed by jacket tube 24 and the outer insulation 25 of hexagonal section. By means of this hexagonal shape, similar to conventional nuclear reactor fuel elements, a gapless construction of a reactor core can be effected with the converter fuel elements of the invention of this application. This construction is applicable to a thermal or slow reactor, but the use of the converter fuel element is not limited to such a reactor type. Thus, for example, fast reactors, naturally, without the moderator, can also be constructed with similar converter fuel elements. Also, the heating of such converter fuel elements can be effected, of course, by other energy sources such as, for example, energy from the sun, which does not require any departure from or further modification of the illustrated and described devices herein.

In conclusion, the special advantages of the converter fuel element constructed in accordance with our invention over conventional fuel elements of this general type are briefly presented:

(1) The efficiency of the thermionic converter using the fuel elements of our invention is increased, which accordingly means an increase in the power density. Thus, for example, for a cesium high-pressure converter and a variation of the spacing between emitter and collector of from 1 mm. to 0.1 mm., a power density increase of substantially 5 w./cm.$^2$ (watts per square centimeter) to 15 w/cm$^2$, which corresponds to an increase in efficiency of substantially 10 to 20%, is obtained.

(2) The life-span or durability of the converter fuel element of this invention, as compared to devices having no regulatable spacing between emitter and collector is increased.

(3) The electrical power output is adjustable.

(4) The durability of the entire reactor is increased due to the smaller consumption of nuclear fuel rendered possible by the feature noted in item (3) above.

(5) The displacing mechanism is reliable under generally universal conditions since it has no sliding components that are located in direct contact with fixed or stationary components.

Of course, other embodiments of the converter fuel element constructed in accordance with the basic principles of our invention are also possible. It is also conceivable to employ the adjusting mechanism proper with other structural elements, preferably in space vehicles, thus, for example for the adjustment of reflector shields outside the nuclear reactor proper.

We claim:

1. Converter fuel element for nuclear reactors comprising a plurality of axially aligned thermionic diodes electrically connected in series, each of said diodes including an annular emitter electrode and an annular collector electrode coaxially surrounding and radially spaced from one another, said electrodes being formed with mutually opposed matching conical surfaces, the emitter electrodes of said diodes containing a supply of nuclear fuel for the reactor and being insulatingly connected to one another, said emitter electrodes as a unit and said collector electrodes being relatively displaceable in their axial direction so as to adjust and correct the spacing between said emitter and said collector electrodes.

2. Converter fuel element according to claim 1, wherein said annular emitter electrode is located within said annular collector electrode, and including a temperature-resistant insulating body coaxially extending through each of said annular emitter electrodes, the insulating bodies being axially aligned and in abutment at the ends thereof, and means at one end of each of said emitter electrodes for centering the respective emitter electrode with respect to its collector electrode, said centering means being out of engagement with the respective insulating body.

3. Converter fuel element according to claim 2, wherein said temperature-resistant insulating body is made of ceramic.

4. Converter fuel element according to claim 2, wherein said axially aligned insulating bodies are joined to one another.

5. Converter fuel element according to claim 2, wherein said axially aligned insulating bodies are comprised of a column extending through said thermionic diodes, and including a yieldable member abutting against one end of said column, and a displacement mechanism abutting against the other end of said column and adapted to axially displace said column toward said resilient member.

6. Converter fuel element according to claim 5, wherein each of said insulating bodies is connected to the respective emitter electrode so that said emitter electrodes are displaceable with said column relative to said collector electrodes.

7. Converter fuel element according to claim 6, wherein said yieldable member comprises a compression spring.

8. Converter fuel element according to claim 6, wherein said yieldable member comprises another displacement mechanism.

9. Converter fuel element according to claim 6, wherein said displacement mechanism is remotely controllable.

10. Converter fuel element according to claim 6, including an outer housing for said displacement mechanism, said displacement mechanism comprising an electrically heatable heat expansible member axially aligned with said column, and securing means at the ends of said heat expansible member spaced from said outer housing.

11. Converter fuel element according to claim 6, wherein said securing means comprises a solder connection loosenable by heating for a regulatable period at time.

12. Converter fuel element according to claim 6, wherein said yieldable member comprises another displacement mechanism and said securing device is located at both ends of said column of insulating bodies.

13. Converter fuel element according to claim 1, including resilient structural members for electrically connecting said diodes in series and for simultaneously centering the same.

14. Converter fuel element according to claim 13, wherein said resilient structural members are substantially flat laminated springs and provide shielding between adjacent electrodes.

15. Converter fuel element according to claim 13, wherein said resilient structural members are conical laminated springs providing shielding between adjacent diodes.

16. Converter fuel element according to claim 2, wherein said emitter electrodes are connected to the respective insulating bodies for axial displacement therewith, and said thermionic diodes, in cross section, have a sawtoothed space between the emitter and collector electrodes thereof.

17. Converter fuel element according to claim 16, wherein said diodes are formed respectively of axially aligned diode portions, the conical surfaces of the emitter and collector electrodes of each of said diode portions being radially offset relative to the adjacent diode portion.

18. Converter fuel element according to claim 16, wherein said collector electrode of said diodes is formed with a helical groove or saw-tooth profile, and the corresponding emitter electrode of said diodes is formed with a matching helical thread of saw-tooth profile meshing, with clearance corresponding to said saw-toothed space, in said groove of said collector electrodes.

19. Converter fuel element according to claim 1, wherein said supply of nuclear fuel is embedded in said emitter electrode.

References Cited

UNITED STATES PATENTS

| | | | |
|---|---|---|---|
| 2,837,666 | 6/1958 | Linder | 310—3 |
| 3,138,725 | 6/1964 | Houston | 310—4 |
| 3,139,542 | 6/1964 | Huber et al. | 310—4 |
| 3,173,032 | 3/1965 | Maynard | 310—4 |
| 3,194,989 | 7/1965 | Garbony et al. | 310—4 |
| 3,329,839 | 7/1967 | Devin | 310—4 |

J. D. MILLER, *Primary Examiner.*

D. F. DUGGAN, *Assistant Examiner.*

U.S. Cl. X.R.

176—39